United States Patent [19]
Nusbickel et al.

[11] Patent Number: 6,119,133
[45] Date of Patent: Sep. 12, 2000

[54] EXTENSIBLE METHOD AND APPARATUS FOR RETRIEVING FILES HAVING UNIQUE RECORD IDENTIFIERS AS FILE NAMES DURING PROGRAM EXECUTION

[75] Inventors: Wendi L. Nusbickel, Delray Beach; Joseph Celi, Jr., Boynton Beach, both of Fla.

[73] Assignee: International Business Machines Corporation, Armonk, N.Y.

[21] Appl. No.: 09/061,387

[22] Filed: Apr. 16, 1998

[51] Int. Cl.[7] ........................................... G06F 17/30
[52] U.S. Cl. .............................. 707/205; 707/200
[58] Field of Search .......................... 707/200, 205, 707/508

[56] References Cited

U.S. PATENT DOCUMENTS

| | | | |
|---|---|---|---|
| 5,842,206 | 11/1998 | Sotomayor | 707/5 |
| 5,857,192 | 1/1999 | Fitting | 713/200 |
| 5,873,076 | 2/1999 | Barr et al. | 707/3 |
| 5,937,064 | 8/1999 | Eick et al. | 707/101 |
| 5,937,406 | 8/1999 | Balabine et al. | 707/100 |
| 5,974,441 | 10/1999 | Rogers et al. | 709/200 |

*Primary Examiner*—Thomas G. Black
*Assistant Examiner*—William Trinh
*Attorney, Agent, or Firm*—Fleit, Kain, Gibbons, Gutman & Bongini PL; Jon A. Gibbons

[57] ABSTRACT

In an information processing system with a database for storing database records wherein each of said database records has a unique identifier, a method for naming data files comprising the steps of: (a) associating at least one of said database records with additional data specified by a data file name; and (b) naming at least part of said data file name to said unique record identifier for said one of said database records of step (a). In an alternate embodiment, an information processing system with a database for storing database records wherein each of said database records has a unique identifier; at least one data file name for specifying additional data wherein part of each data file name is composed of one of said unique identifiers for one of said database records, a method for locating data files comprising the steps of: retrieving one of said database records; determining said unique identifier for one of said database records; and retrieving any additional data using said data file name.

32 Claims, 7 Drawing Sheets

*FIG. 1*

REGION SEARCH SCREEN

| RECORD ID | REGION | FILE |
|---|---|---|
| 100 | FLORIDA NORTH-WEST | FLNW.GIF |
| 101 | FLORIDA NORTH-CENTRAL | FLNC.GIF |
| 102 | FLORIDA NORTH-EAST | FLNE.GIF |
| 103 | FLORIDA SOUTH-WEST | FLSW.GIF |

301 · · ·    303    305

PRIOR ART DATABASE ENTRY

| RECORD ID | REGION |
|---|---|
| 100 | FLORIDA NORTH-WEST |
| 101 | FLORIDA NORTH-CENTRAL |
| 102 | FLORIDA NORTH-EAST |
| 103 | FLORIDA SOUTH-WEST |

100.GIF

101.GIF

102.GIF

103.GIF

SAMPLE LISTING DISPLAY

| RECORD ID | FLAG |
|---|---|
| 100 | 100001 (33) |
| 101 | 111111 (63) |
| 102 | 101000 (42) |
| 103 | 110010 (50) |

33.GIF

63.GIF

42.GIF

50.GIF

EXTENSIBLE METHOD AND APPARATUS FOR RETRIEVING FILES HAVING UNIQUE RECORD IDENTIFIERS AS FILE NAMES DURING PROGRAM EXECUTION

CROSS-REFERENCE TO RELATED APPLICATIONS

Not applicable.

BACKGROUND OF THE INVENTION

1. Field of the invention

The present invention relates to the field of computer information retrieval. More particularly, the present invention relates to a method and apparatus to retrieve computer related data files when the required file name is not known until program execution time.

2. Description of the Related Art

Traditional paper telephone directory listings like the White Pages, Yellow Pages and industry specific directory listings have been around for decades. Online or Web-based directory listings are the online analogues to their familiar, traditional paper counterparts. With the advent of the Internet and the Web (World-Wide-Web), many owners and publishers of these directories have begun to offer their services online. These online directory services are expanding beyond providing simply name, address and telephone information and have begun to offer E-Mail directory listings, Web page address listings, fax directory listings, maps of the business location, additional information in a multimedia format about the business listing and much more.

Computer applications such as online directory services use database retrieval techniques to present data to users. These classes of applications are often referred to as "data driven" because the exact display of the data on the computer screen is not known until runtime. Typically, these applications provide information in response to a user request by filling-in fixed data fields in a presentation screen with data retrieved from a database. In the online directory listing example data fields are filled-in with data stored in a database. The data includes residential name or business name, address and telephone number. Optional data fields such as zip code may also be included. As the types and variety of online directory services increase, the requirement to advertise the availability of these online services also increases. Many of these new services are data driven. As an example, online directory listings may offer images of street maps over the Web. The street maps are presented in response to a user request or query. The exact query is not known until program runtime (refer to www.yahoo.com for an online example of mapping street locations). A challenge for programmers and software designers is providing the correct regional map for each user request. Software designers typically use relational databases to organize data such as images files of regional maps. The use of databases allows images of regional maps to be indexed in an organized manner in order to be retrieved with a given user query. Database records comprising a series of database elements designed to hold one or more types of data. One type of database record is designated to hold the names of image files, such as images of street maps, and names of data files. It is common to create a separate database record holding these file names. The software designer creates separate database record entries to hold these file names to enable fast, efficient retrieval of these image files in response to user search requests.

One disadvantage with the use of separate database entries for holding the names of data files is the inability to extend or expand the number of these database entries without updating the corresponding program logic. System developers using separate database entries for holding the names of data files require either that: a separate database entry be associated with every street address; or some type of indexing table lookup system must be invoked in order to display the correct regional map image. A shortcoming of this method is that the database or mapping file and associated algorithm to retrieve the correct file must be updated when new regional maps are added. So a need exists to make an extensible file retrieval system that can accommodate additional entries into a file system without the need to update the programming logic every time an addition or deletion is made.

A second problem that exists when using separate database record entries for holding the names of data files, is the need to test database references. Software programmers run tests to debug every line of programming logic designed for mapping a data file to specific data file requests. The inclusions of new files into database files requires the retesting of this programming logic. Therefore, a need exists to provide a method to retrieve files without the need to test every reference to a particular file.

A third problem, when using separate database record entries for holding the names of data files is the need to determine efficiently data file names where the data may include a large combination of distinct elements or segments. For example, certain data files in online directory listings may include a series of distinct graphical icons where each icon represents a particular electronic service. Six additional available services in an online business directory listing may include: a map of the business location; a video clip about the business, an audio clip about the business, a homepage for the business listing, E-Mail for the business listing and a fax number for the business listing. Representative graphical icons may include an icon of an envelope for E-Mail service and an icon of a film clip for video information. The online directory services displays these icons next to a particular business directory listing according to the services available. In this business directory listing example, as mentioned above, there are six distinct possible types of icons that can be displayed through a series of icon images. Calculating the possible combination of these additional six directory services, there are $2^7$ or 64 separate combinations of these additional online services. Each of these 64 combinations requires a unique data file name. Each data file name refers to a particular series of icons representing the online services available. As the example for six additional services above illustrates, the use of icons advertising the availability of services produces the need for an exponentially large number of file names needed to advertise these service combinations. It is important to note that the addition of every new service doubles the number of file names needed to represent all these service combinations. Stated differently, adding one new service to the six services above yields 27 or 128 separate icon image combinations that are available. Therefore, an efficient, extensible method of runtime retrieval of file names representing a large number of possible image combinations is needed.

SUMMARY OF THE INVENTION

Briefly, in accordance with the present invention, in an information processing system with a database for storing database records wherein each of said database records has a unique identifier, a method for naming data files comprising the steps of: (a) associating at least one of said database records with additional data specified by a data file name; and (b) naming at least part of said data file name to said unique record identifier for said one of said database records of step (a).

In an alternate embodiment, an information processing system with a database for storing database records wherein each of said database records has a unique identifier; at least one data file name for specifying additional data wherein part of each data file name is composed of one of said unique identifiers for one of said database records, a method for locating data files comprising the steps of: retrieving one of said database records; determining said unique identifier for one of said database records; and retrieving any additional data using said data file name.

DESCRIPTION OF A PREFERRED EMBODIMENT

Figure 1:
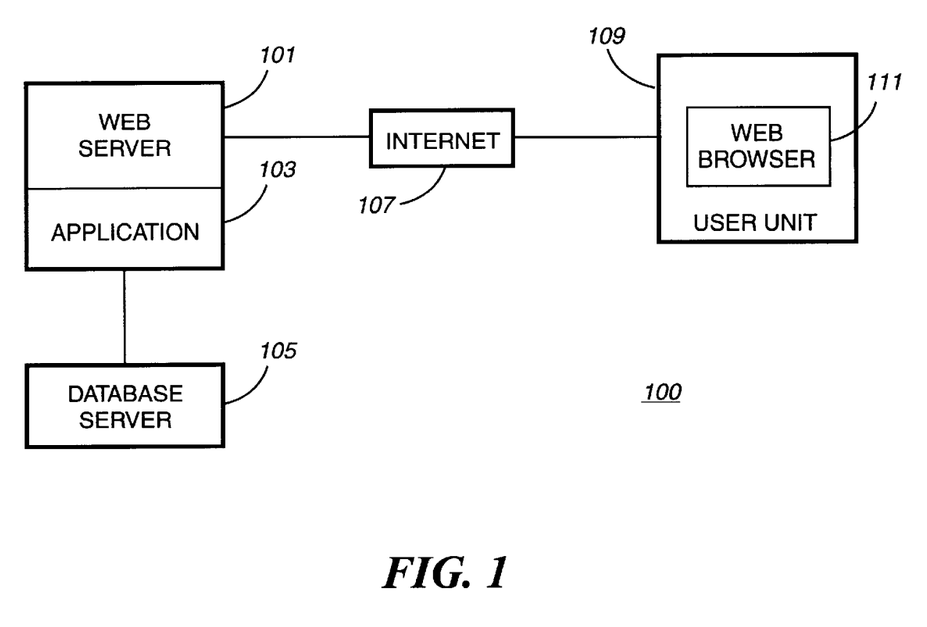
FIG. 1 is a functional block diagram of a typical data processing system for hosting Web pages.

FIG. 1 depicts a functional block diagram of a data processing system for hosting Web pages 100. A Web server 101 running a Web server application 103 and coupled to a data base server 105. The Web server 101 can be an IBM compatible computer capable of running any HTTP (Hyper-Text-Transfer-Protocol) compatible server software such as Netscape Web server products or equivalent. The Web server 101 is connected to the Internet 107. An end user data processing unit 109 with Web browser 111 is connected to the Internet 107 or other computer network. The Web browser 111 can be any HTTP compatible product such as Netscape Navigator, Sun Hot Java Browser, Microsoft Internet Explorer or equivalent.

The application 103 is an online directory listing system for hosting directory listings on the Web browser 111. Publishers of directory listings such as regional telephone companies provide the name, address, and telephone directory listing information for the database server 105. It is important to point out that the precise operating systems and hardware configurations of the database server 105, the Web server 101, the end user unit 109 and the Web-browser 111 are not limited to any specific hardware or software configuration. These systems can be implemented on a wide variety of hardware and software platforms.

The online directory application 103 provides directory listing services running on the Web server 101 for listing information stored on database server 105 to be rendered over Internet 107 on Web browser 111. An end user has the ability to enter desired search criteria into the application 103. The Web browser 111 through Internet 107, communicates with the Web server 101 to query the database server 105. The results of the query from database server 105 are then sent back, through the Web server 101 and over the Internet 107, to the end user browser 111.

Figure 2:
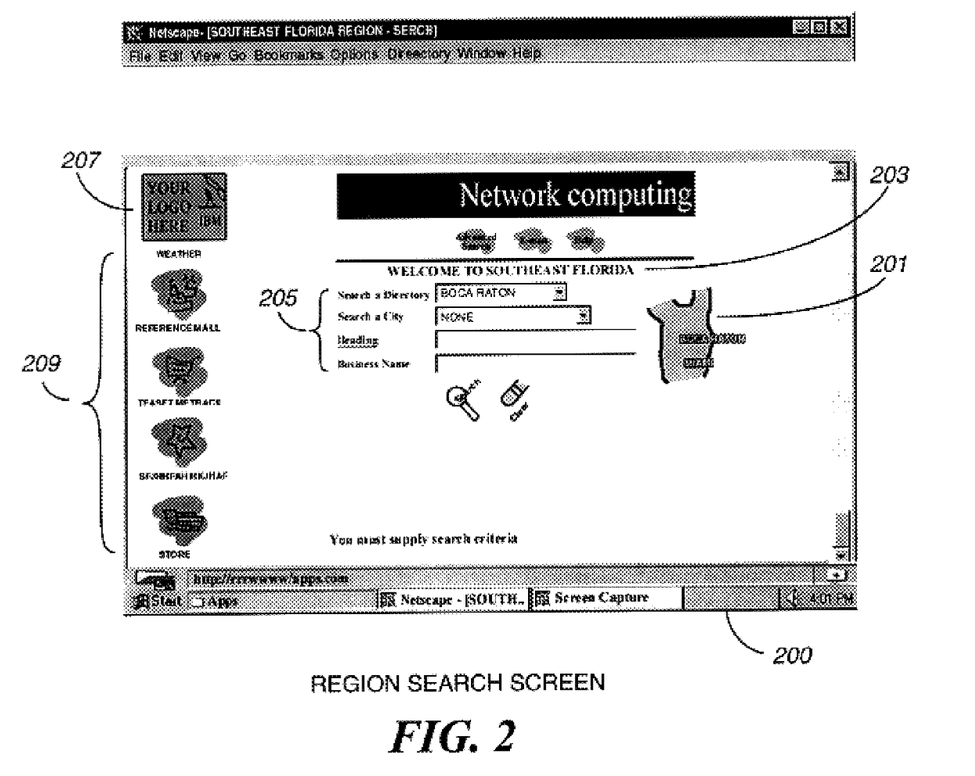
FIG. 2 is an illustration of a Web browser screen displaying an example of an online Yellow Pages directory search screen.

FIG. 2 illustrates a typical Yellow Pages directory listing service search screen 200 rendered on the Web browser 111. The use of HTML compliant codes for presenting database queries is well understood. Online Yellow Page directory listings, as in their traditional paper counterpart are available for specific county, specific city and specific state directory regions. Yellow Pages directory listing service search screen 200 is for regional southeast Florida as denoted by a title bar 203. A corresponding southeast Florida map 201 is displayed. A user selects a search criteria 205 comprising a region, a city, a directory heading or a business name. An advertisement 207 and the availability of additional information 209 is also displayed. It is important to understand that the layout of the search screen 200 remains consistent from regional directory area to regional directory area. Stated differently, the information in the title bar 203 and the map 201 change to reflect the directory region being used, e.g., southwest Florida, northeast Florida, northwest Florida, east central Florida and so on. Advertisement 207 and additional information 209 may also change depending on which regional directory a user is searching. Predefined screen layouts, sometimes called screen views or graphical screen templates are used to present data from a database in a particular style, arrangement, selection and format. The use of graphical search screen templates with areas such as the title bar 207 and the map 201 is well known. Commercial products that allow developers to build applications for constructing Web pages using templates whose data are filled-in from an associated database during runtime are available. Products such as the Lotus Domino Server give developers tools for defining desired views into a database.

Figure 3:
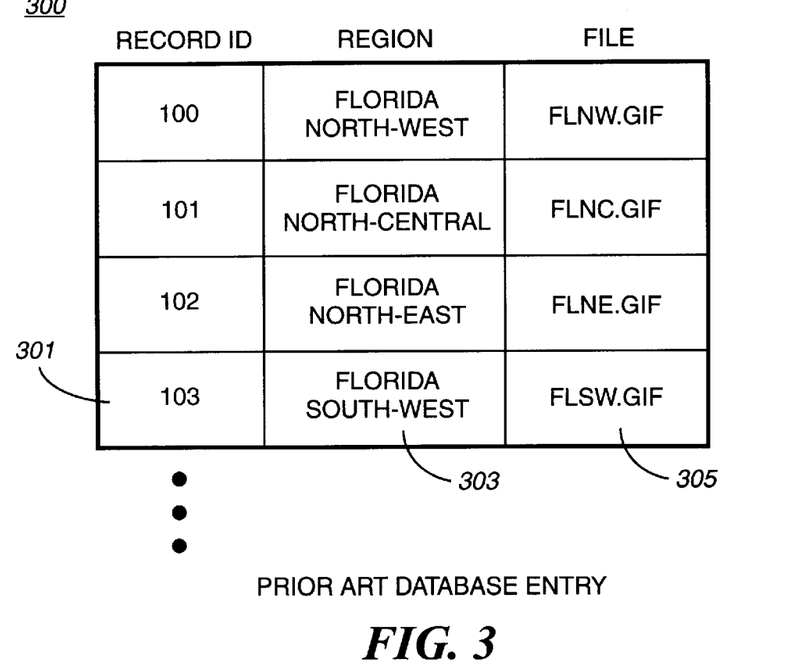
FIG. 3 is an illustration of a portion of database records of prior art file location systems.

FIG. 3 is an illustration of a portion of database records 300 of a prior art file location system. Notice a record ID 301 of associated database records 300. This record ID 301 is unique to each database record so that no two database records contain the same record ID 301. Each record of database records 300 comprises a regional title bar entry 303 and regional map image file 305. This information retrieved from the database, fills-in or loads the corresponding fields inside an HTML template The graphical search screen template in the preferred embodiment is an HTML document template. The process of filling information in an HTML template is known. Image file 305 is a GIF (Graphics Interchange Format) file, but any multimedia file format can be used. The image file 305 is used to fill in the map 201 to correspond to regional locations of the database being searched. For the Yellow Pages directory listing service search screen 200 of FIG. 2 this is in the southeast map image 201 of Florida. Regional title bar entry 303 is used to fill-in the text displayed in the title bar 203.

Figure 4:
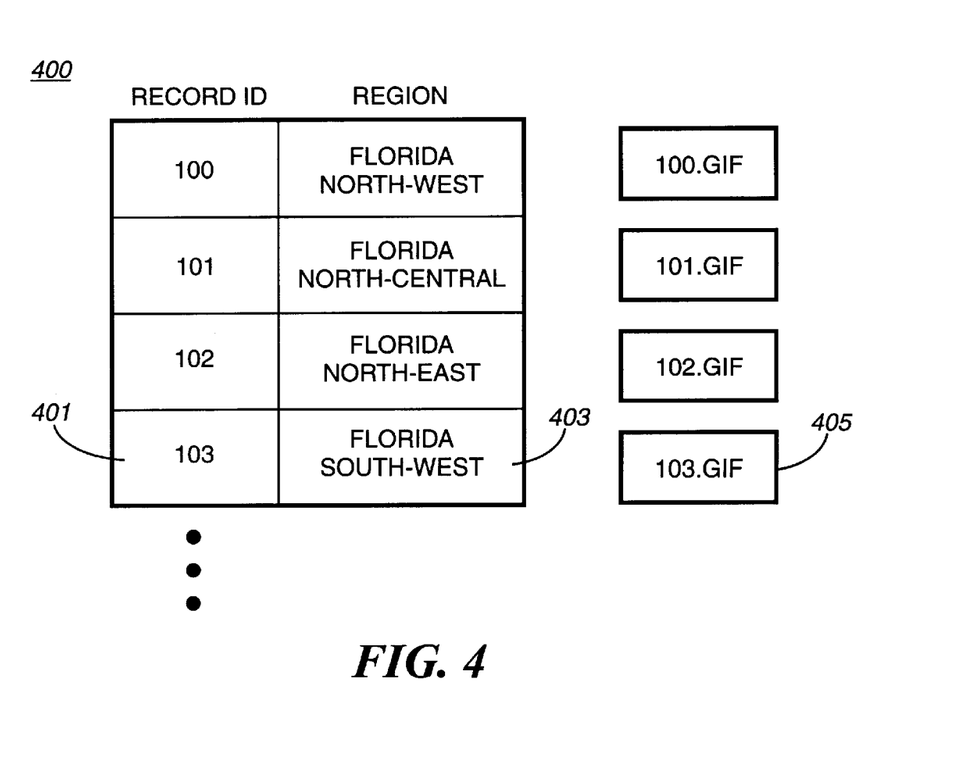
FIG. 4 is an illustration of a portion of database records and associated data files according for a file location system to the present invention.

FIG. 4 is an illustration of a portion of database records 400 and associated data files for a file location system according to the present invention. A record ID 401 and a regional title bar entry 403 are identical to the database entries 301 and 303 of the prior art database records 300. It is important to notice there is no entry for image file 305. Instead the file is named by a predetermined format consisting of a field corresponding to the record ID and a file extension .GIF denoting the file type. File name 405 is an example image file name used to fill-in map 201 of search screen 200. Here the value of 103 derived from the record ID 401 is combined with the suffix .GIF to create a name 103.GIF for file name 405. By naming the image file according to a unique record ID, there is no need to include a database record for image file 305. The elimination of database record 305 results in a smaller overall database. A smaller database requires less computer storage and often provides faster performance. It is important to note that other types of unique identifiers can be used for this present invention besides a database record ID. For this Yellow Page directory listing example, ID's such as unique listing IDs, unique business IDs, unique GEO codes (codes specifying the precise geographical longitude and latitude position of a listing location) can be used.

Returning to the description of FIG. 4, the unique ID 401 is determined when application 103 retrieves the database entry. The technique of determining the unique record ID 401 for a database record is well known. The use of the record ID 401 with a known suffix is all that is needed in the application 103 to fetch the appropriate file during program execution. In addition, there is no need to change the application 103 if database record entries are later added and deleted since the file name is determined at runtime. The use of suffix GIF is optional. Any suffix, even no file name suffix can be used. Moreover, the use of the unique record ID 401 can be included as a portion of a larger file name naming hierarchy. The required programming logic for the application 103 must be matched to any file naming convention used to create the correct file name 403 from the unique record ID 401. For example, it may be beneficial to start all map files with the prefix "MP" and denote all these map files are stored in 64 color format "64". So the resulting name would be MP10364.GIF for file name 405. Programming logic in application 103 for retrieving images would correspondingly add an "MP" prefix in front of the unique record ID 401 of 103 and add the appropriate file extension GIF to retrieve the corresponding image file 405.

Figure 5:
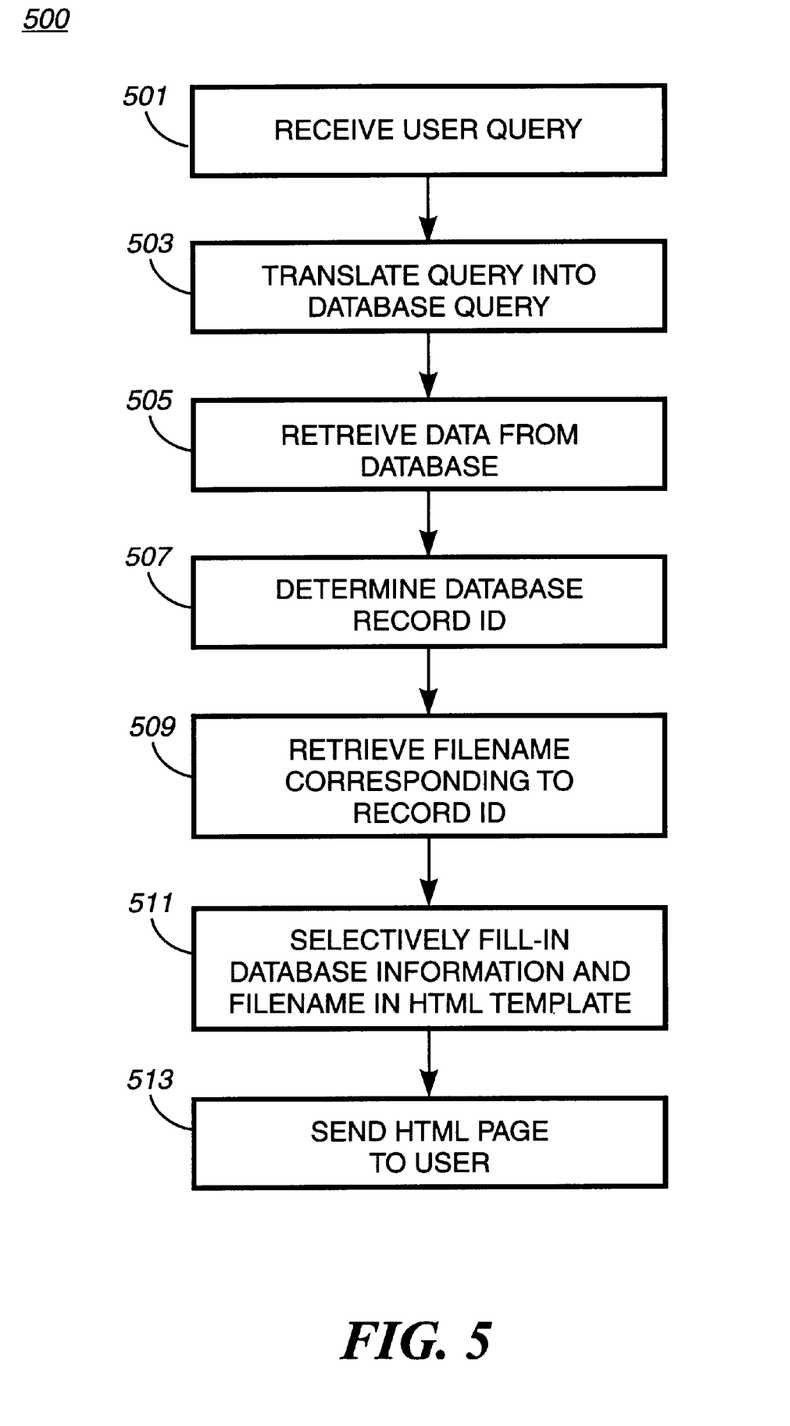
FIG. 5 is an application process flow chart for an application running on the Web server of FIG. 1 according to the present invention.

Referring now to FIG. 5 shown is an application process flow chart 500 of the application 103 running on the Web server 101. The application begins with receiving the user request, step 501, from Web browser 111 via Internet 107. This request is a database search request for the user selected criteria 205 as described above. The request is translated into the corresponding database server call, step 503. Popular database call formats include SQL as supported by Oracle and IBM. The database call retrieves data from database server, step 505. The process of retrieving data from a relational database is well known. Next, the record ID is determine for the database record, step 507. The file name 405 for the image file 201 corresponding to the unique record ID 401 is retrieve, step 509. The image file 201 is along with other database records 400 are used to fill-in the HTML Web page template, step 511. The resulting HTML compatible Web page is sent to the user unit 109 for display on the Web browser 111 via the Internet 107, step 513.

It is important to note that once a desired naming convention that includes unique record ID 401 is chosen for file names 405 and the programming logic of the application 103 is set accordingly, there is no need to change the application 103. The application 103 can be completely data driven. Moreover, there is no need to test application 103 as new database records 400 are added or deleted. There is no need to update the program logic of application 103 if the database records 400 are reorganized or changed.

Although this preferred embodiment discloses application 103 as creating HTML compatible Web pages sent over Internet 107 to Web browser 111. Other client-server implementations are possible. One implementation of application 103 is the creation of a JAVA compliant APPLET where the APPLET is sent to a client computer and the data presented to the user on the end user unit 107. In this implementation the Web browser 111 is replaced by a JAVA enabled end user unit 107, such as a Java enabled thin client system from IBM or Sun Microsystems. In still another implementation, the application 103 can be completely host-based and the end user unit 107 a "dumb" terminal. Host based computer systems are known. An IBM ES/9000 unit connected to IBM 3278 graphics terminals is an example host-based system with the corresponding "dumb" terminals.

Figure 6:
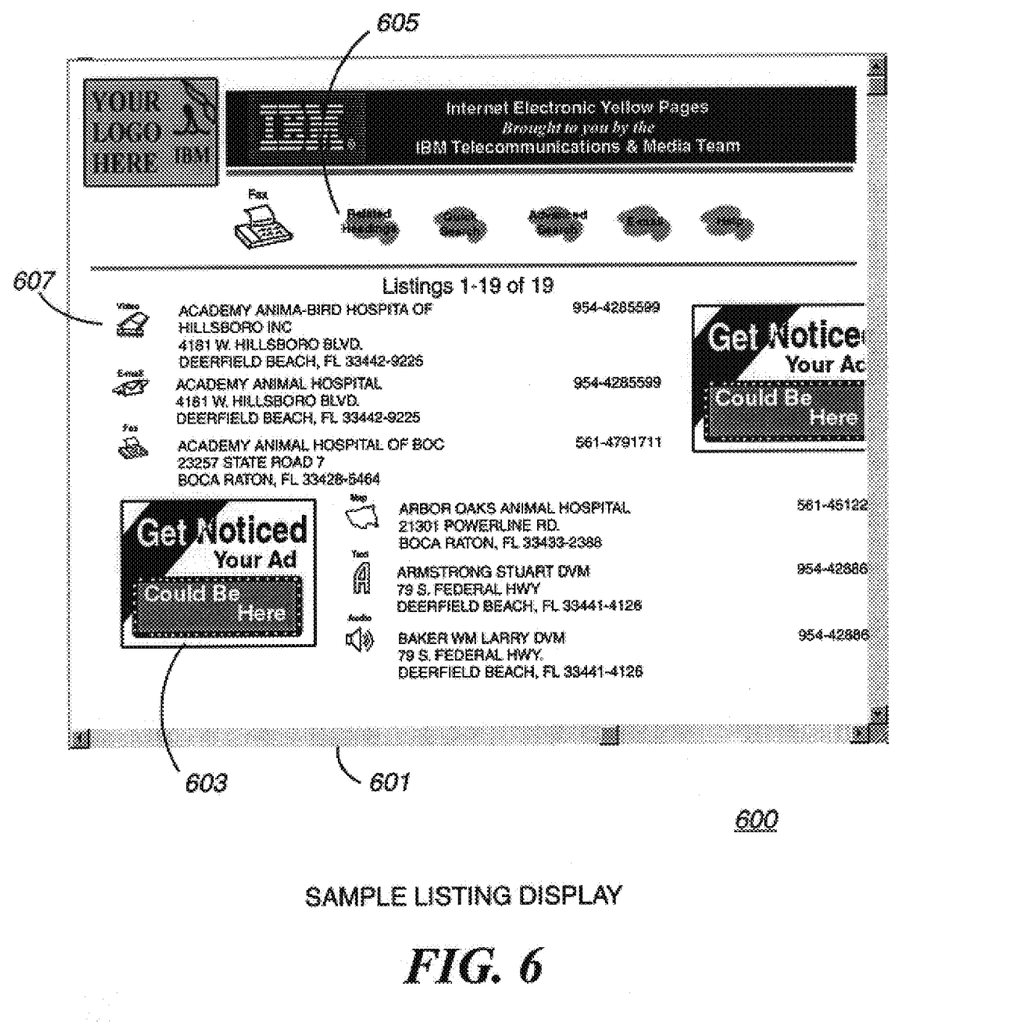
FIG. 6 is an illustration of a Web browser screen displaying the ensuing search results of FIG. 2 for an alternative embodiment of the present invention.
Figure 7:
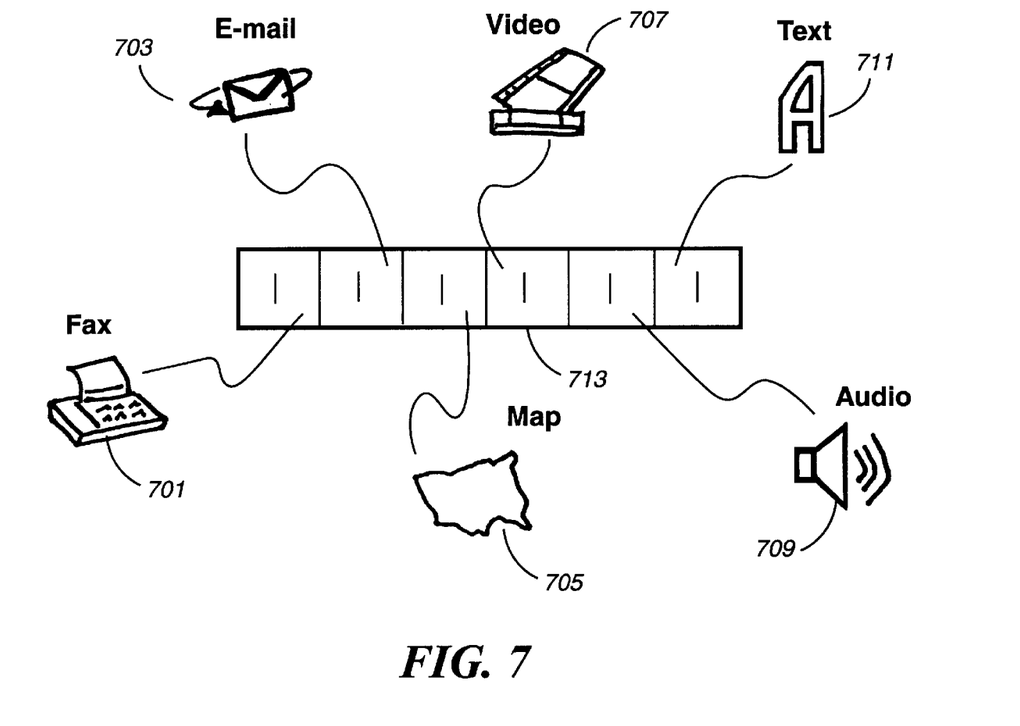
FIG. 7 is a block diagram of the file flag for referencing additional data files according to FIG. 6.

Referring to FIG. 6, an alternate embodiment of the present invention is described. FIG. 6 is an illustration of a Yellow Pages directory listing for a keyword search of "veterinarian" for a business heading 600. The sample business listing 601 alphabetically displays the business under the "veterinarian" business category. Again this is similar to the traditional Yellow Page listings found in the bound paper analogues. An example advertisement space 603 and the availability of related directory services 605 are also displayed. Additional directory services 607 are shown as icons. These icons are animated GIF files that present an image of each service available for this directory listing service in a repetitive series. Each directory listing may have different available additional directory services. FIG. 7 is a block diagram of the file flag for additional directory services 700 according to the present invention. Six icons of additional directory services for a directory listing are shown. Starting from the left, these icons represent a fax service 701, an E-Mail service 703, a map service 705, a video clip 707, an audio clip 709, and text information 711. Each of these six additional services represents a bit position in file flag 713. The availability of each service is denoted by a logical true value, or number 1.

Figure 8:
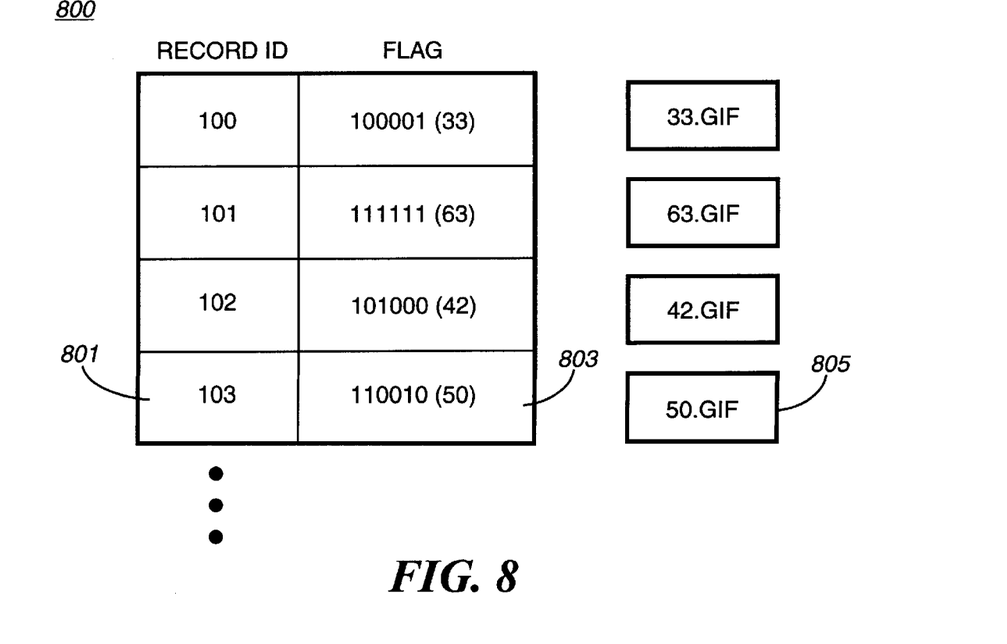
FIG. 8 is an illustration of a portion of database records using the file flag of FIG. 7 and associated data files according to the present invention.

FIG. 8 is an illustration of a portion of database records 800 using the file flag 713 and associated data files according to the present invention. File flag 713 is a record in database record 803 with corresponding unique Record ID 801. There are six additional service icons for file flag 713. This represents 26 or 64 separate combinations of these additional service icons. Database record 803 contains a binary value of 110010. The decimal equivalent of 50 denoted in parenthesis for convenience and does not need to be stored. The exact number system representation, e.g., binary, decimal, octal, is not important and binary and decimal is used in this description interchangeably. Continuing with database record 803, the binary value of 110010 denotes the following services are available for a corresponding directory listing: fax service 701, E-Mail service 703 and audio clip 709. Correspondingly, the following services would not be available for this directory listing example with a file flag 713 binary value of 110010: a map service 705, a video clip 707 and text information 711. All 64 animated GIF files for these images are typically created automatically through an automated tool (not shown). These 64 animated GIF files are then made available to application 103 during runtime. The creation of all 64 animated image files in advance saves on Web server overhead during Web page construction.

It is important to note that the addition of every new service doubles the number of file names needed to represent all these service combinations. Stated differently, adding one new service to the six services above yields $2^7$ or 128 separate icon image combinations that are available. The programming logic can be extended to manage long file flag 713 values accordingly.

Figure 9:
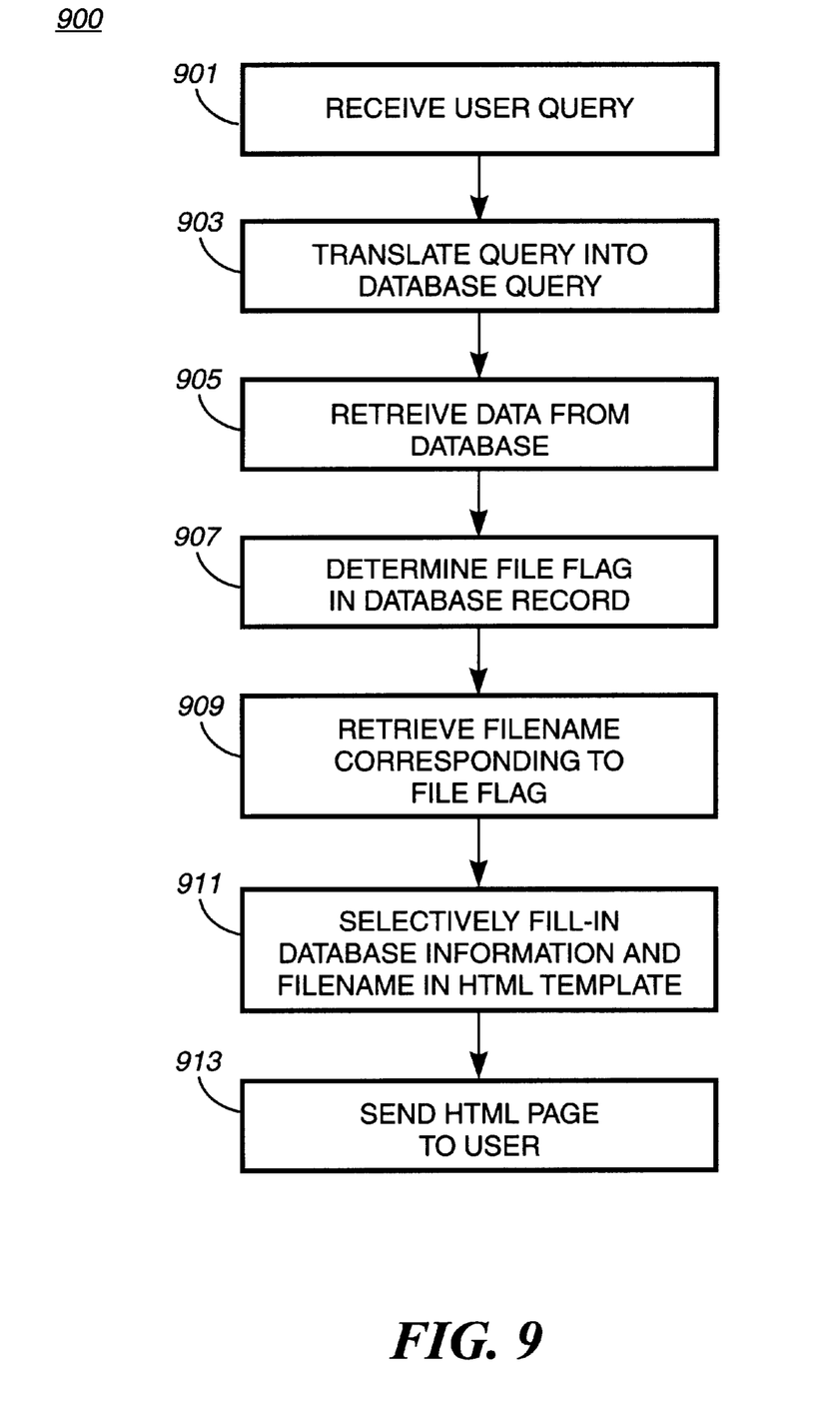
FIG. 9 is an application process flow chart for the alternative embodiment of FIG. 6 for an application running on Web server of FIG. 1 including additional file flag of FIG. 7 according to the present invention.

FIG. 9 is an application process flow chart 900 of the alternative embodiment of FIG. 6 for the application 103 running on the Web server 101. The initial process steps 901, 903, and 905 of retrieving a user query, translating the user query into a database query and retrieving data from a database is identical to the previously described process steps 501, 503 and 505 of FIG. 5. Next, the file flag 713 for the database record is determined, in step 907. Selecting desired database records in a relational database is known. Once the file flag 713 is determined, a file name 805 corresponding to the file flag 713 is constructed by application 103 and the associated image file is retrieved, in step 909. The construction of the file name can use any set of rules as previously described in process flow chart 500 where suffixes, prefixes and other information is added to the file flag 713 to create the resulting file name 805. Returning to the animated GIF examples, a file prefix of "AN" for animated GIF combined with the example file flag binary value of 110010 (decimal 50) and a file extension of GIF would create AN50.GIF for file name 805. As previously described above (steps 411 and 413), the steps 911 and 913 fill-in the HTML template with data from the database records 800 and the animated image file named by the file flag 713 and send the resulting HTML compatible Web page to the user.

It should be understood that the file data referenced by the file name 405, referenced by the file flag 713, and referenced by the file name 805 are not limited to any specific data file type or any specific file format. Any data type or data format (audio, video, text, multimedia) can be retrieved using the methods and apparatus described in this present invention.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. In an information processing system with a database for storing database records wherein each of said database records has a unique record identifier, a method for naming data files comprising the steps of
   (a) associating at least one of said database records with additional data stored in said data file, specified by a data file name; and
   (b) naming at least part of said data file name to said unique record identifier for said one of said database records of step (a).

2. The method for naming data files of claim 1, wherein said step (a) further comprises:
   (a) associating at least one of said database records with additional multimedia data referenced by a data file name.

3. In an information processing system with a database for storing database records wherein each of said database records has a unique record identifier, at least one data file name for specifying additional data wherein part of each data file name is composed of one of said unique record identifiers for one of said database records, a method for locating data files comprising the steps of
   (a) receiving a query;
   (b) retrieving data from the database, based on the query, the data including a unique record identifier; and
   (c) retrieving further data by retrieving at least one file whose file name includes the unique record identifier, the file containing the further data.

4. The method for locating data files of claim 3, further comprising the step of:
   (f) creating a Web page using HTML compatible codes for rendering said at least part of said database records and at least part of said additional data.

5. The method for locating data files of claim 3, further comprising the step of:
   (f) creating a Web page for an online directory listing using HTML compatible codes for rendering at least part of said database records and at least part of said additional data.

6. The method for locating data files of claim 3, further comprising the step of:
   (f) creating a Web page for an Internet search listing using HTML compatible codes for rendering at least part of said database records and at least part of said additional data.

7. The method for locating data files of claim 3, further comprising the step of:
   (f) creating an application for rendering at least part of said database records and at least part of said additional data, wherein said application executes on a client system coupled to said information processing system.

8. The method for locating data files of claim 3, further comprising the step of:
   (f) creating a JAVA compliant application for rendering at least part of said database records and at least part of said additional data, wherein said application executes on a client system coupled to said information processing system.

9. In an information processing system with a database for storing database records wherein each of said database records has a unique record identifier, a computer readable storage medium containing program instructions for naming data files, said program instructions comprising instructions for:
   (a) associating at least one of said database records with additional data, stored in said data file, specified by a data file name; and
   (b) naming at least part of said data file name to said unique record identifier for said one of said database records of step (a).

10. The computer readable storage medium of claim 9, further comprises:
    associating at least one of said database records with additional multimedia data referenced by a data file name.

11. In an information processing system with a database for storing database records wherein each of said database records has a record unique identifier; one or more data file names for specifying additional data wherein part of each data file name is composed of said unique record identifiers for one of said database records, a computer readable storage medium containing program instructions for locating data files, said program instructions comprising instructions for;

(a) receiving a query;
(b) retrieving data from the database, based on the query the data including a unique record identifier; and
retrieving further data by retrieving at least one file whose file name includes the unique record identifier; the file containing the further data.

12. The computer readable storage medium of claim 11, further comprising instructions for:
creating a Web page using HTML compatible codes for rendering said at least part of said database records and at least part of said additional data.

13. The computer readable storage medium of claim 11, further comprising instructions for:
creating a Web page for an online directory listing using HTML compatible codes for rendering at least part of said database records and at least part of said additional data.

14. The computer readable storage medium of claim 11, further comprising instructions for:
creating a Web page for an Internet search listing using HTML compatible codes for rendering at least part of said database records and at least part of said additional data.

15. The computer readable storage medium of claim 11, further comprising instructions for:
creating an application for rendering at least part of said database records and at least part of said additional data, wherein said application executes on a client system coupled to said information processing system.

16. The computer readable storage medium of claim 11, further comprising instructions for:
creating a JAVA compliant application for rendering at least part of said database records and at least part of said additional data, wherein said application executes on a client system coupled to said information processing system.

17. In an information processing system with a database for storing database records wherein each of said database records has a unique record identifier, a system for naming data files comprising:
associating means for associating at least one of said database records with additional data, stored in said data file, specified by a data file name; and
naming means for naming at least part of said data file name to said unique record identifier for said one of said database records from said associating means.

18. The information processing system for naming data files of claim 17, wherein said associating means further comprises:
means for associating at least one of said database records with additional multimedia data specified by a data file name.

19. In an information processing system with a database for storing database records wherein each database record has a unique record identifier; at least one data file name for specifying additional data wherein part of each data file name is composed of one of said unique record identifiers for one of said database records, a system for locating data files comprising:
first retrieving means for receiving a query;
determining means for retrieving data from the database, based on the query, the data including a unique record identifier; and
second retrieving means for retrieving further data by retrieving at least one file whose file name includes the unique record identifier, the file containing the further data.

20. The information processing system for locating data files of claim 19, further comprising:
creating means for a Web page using HTML compatible codes for rendering at least part of said database record and at least part of said additional data.

21. The information processing system for locating data files of claim 19, further comprising:
creating means for creating a Web page for an online directory listing using HTML compatible codes for rendering at least part of said database record and at least part of said additional data.

22. The information processing system for locating data files of claim 19, further comprising:
creating means for creating a Web page for an Internet search listing using HTML compatible codes for rendering at least part of said database record and at least part of said additional data.

23. The information processing system for locating data files of claim 19, further comprising:
creating means for creating an application for rendering at least part of said database record and at least part of said additional data, wherein said application executes on a client system coupled to said information processing system.

24. The information processing system for locating data files of claim 19, further comprising:
creating means for creating a JAVA compliant application for rendering at least part of said database record and at least part of said additional data, wherein said application executes on a client system coupled to said information processing system.

25. In an information processing system with a database for storing database records; at least one data file name for specifying a series of data, a method for naming a series of data files using file flags comprising the steps of:
(a) creating a database record that includes a field with flags, and
(b) naming at least part of said series of data files based on numerical equivalents of all possible flag combinations.

26. The method of claim 25, wherein said data series are images relating to a group of online services.

27. In an information processing system with a database for storing database records; at least one data file name for specifying additional data, a system for locating a series of data files using file flag comprising:
(a) creating means for creating a database record that includes field with flags;
(b) naming means for naming at least part of said series of data files based on numerical equivalents of all possible flag combinations; and
(c) retrieving means for retrieving the file name whose name corresponds to the states of the flags in the database record, when selecting a database record.

28. The information processing system for locating data files of claim 27, wherein said data series are images relating to a group of online services.

29. In an information processing system with a database for storing database records; at least one data file name for specifying series of data, a computer readable storage medium containing program instructions for naming a series of data files, said program instructions comprising instructions for:
(a) creating a database record that includes a field with flags; and (b) naming at least part of said series of data files based on numerical equivalent of all possible flag combinations.

30. The computer readable storage medium of claim 29, wherein said data series are images relating to a group of online services.

31. In an information processing system with a database for storing database records; at least one data file name for specifying series of data, a system for naming a series of data files using file flags comprising:

(a) creating a database record that includes field with flags; and (b) naming at least part of said series of data files based on numerical equivalents of all possible flag combinations.

32. The information processing system of claim 31, wherein said data series are images relating to a group of online services.

* * * * *